Feb. 13, 1940. J. A. BALL ET AL 2,189,933
LIGHT DIVIDING DEVICE
Original Filed Jan. 16, 1936
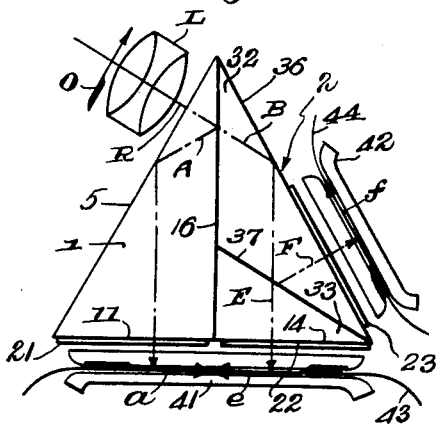
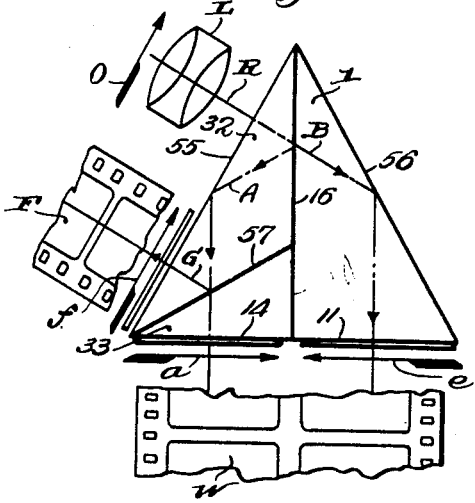
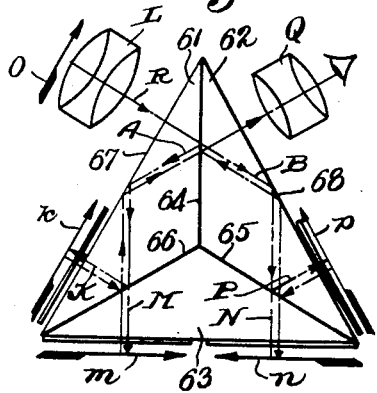
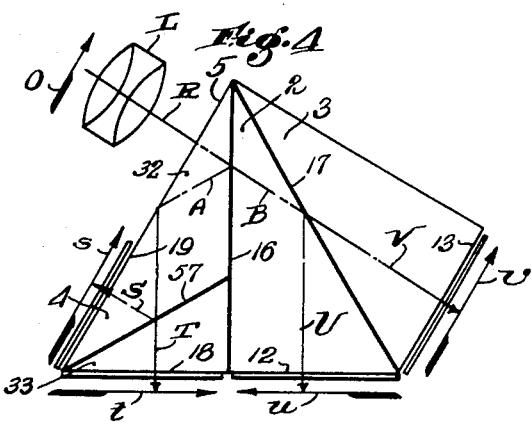
Inventors:
Joseph A. Ball,
Wadsworth E. Pohl,
By Roberts, Cushman & Woodbury
Attys.

Patented Feb. 13, 1940

2,189,933

UNITED STATES PATENT OFFICE 2,189,933

LIGHT DIVIDING DEVICE

Joseph A. Ball and Wadsworth E. Pohl, Hollywood, Calif., assignors to Technicolor Motion Picture Corporation, Hollywood, Calif., a corporation of Maine Original application January 16, 1936, Serial No. 59,360. Divided and this application March 23, 1939, Serial No. 263,720

6 Claims. (Cl. 88—1)

This invention relates to apparatus for simultaneously forming a plurality of optical images which are for practical purposes identical and especially suited for purposes of color photography with three or more color separation records. The present application is a division of the copending application Serial No. 59,360, filed January 16, 1936.

Light dividers of various types have been proposed for this purpose, but they all suffer from certain disadvantages, as for example complicated and unequal light paths involving much light absorption and necessitating difficult optical compensations, or, if the light dividing surface intersects an aperture through which the light enters, more or less parallax between the part images.

The present invention has the objects to provide an optical system forming a plurality of images of an object field, overcoming the disadvantages inherent in prior systems for this purpose, to provide a system of this type which maintains equal optical paths in both air and glass, which produces part images which are for practical purposes geometricaly identical and at the same distance from the object, to provide a light dividing prism with a minimum of reflecting and transmitting surfaces and a minimum length of the optical paths, to provide a light dividing system which is very compact and therefore especially suited for use with short focus objectives, and permitting convenient use in still picture cameras as well as with film movements for purposes of motion picture photography, and generally, a light dividing system which is particularly suitable for multicolor photography for producing still picture records as well as cinematographic films.

These and other objects and aspects will be apparent from the following explanation illustrating the genus of the invention by describing several typical embodiments which are also shown in the drawing which represents in Figs. 1 and 2 diagrammatic views of light dividers for producing three part images, and in Figs. 3 and 4 similar views of devices for producing four part images.

Fig. 1 shows a light dividing system according to the present invention, which consists of three component prisms 1, 32 and 33, components 32 and 33 together constituting a prism 2 which is shaped similar to prism 1. Prisms 1 and 2 are preferably of right angled triangle cross-section with angles of 30° at the common apex. Prisms 32 and 33 are abutting at surface 37 bisecting the 60° angle of prism 2, and prisms 1 and 2 are abutting at surface 16 which may be said to bisect the 30° angle of an equilateral prism composed of components 1, 32 and 33. While this shape is not essential, it is desirable for purposes of the invention in order to provide equal optical paths. The surfaces where 1 and 32, 1 and 33, and 32 and 33, respectively, are abutting are cemented together and partly reflecting.

Semi-transparent reflecting surfaces can be made in various ways, for example, by sputtering a thin deposit of metal on one of the abutting surfaces before cementing them together, or by removing, in the form of a regular or irregular grid, portions of a totally reflecting deposit applied to one of the two surfaces. The surfaces joined as above described form partly transparent reflecting intermediate areas 16 and 37. It will be understood that the ratio of transmitted and reflected light can be adjusted by varying the thickness of a sputtered metal layer or the ratio of reflecting and transmitting areas of a grid, and that the color of the transmitted and reflected beams can to some extent be regulated by suitably selecting the reflecting material. Filters 21, 22, 23 may be cemented to faces 11, 14 and 36 of the prisms.

A light beam bearing an image of object O is formed by an objective lens L of any suitable type and, as indicated by its axis R, enters prism 1 at surface 5, proceeding towards surface 16 where it is divided into two component secondary beams A and B. Reflected beam A again traverses prism 1 and, striking surface 5 at an angle of total reflection, is deviated parallel to surface 16 towards face 11 perpendicular thereto, where it emerges from the prism. Transmitted beam B proceeds through prism 32 towards surface 36 which it is totally reflected towards dividing surface 37 between prisms 32 and 33. Beam B is therefore partly reflected and partly transmitted at 37 and thus divided into component tertiary beams E and F.

It will be noted that image e is reversed with respect to images a and f, since beam E is reflected once and beams A and F twice.

The images may be recorded on photographic emulsions either on plates or films in suitable holders for still picture photography, or on film strips for motion picture photography. The former may be removably retained by conventional means, and the latter may be arranged in different ways, either parallel to, or crossing the line which forms the apex of the prism.

In Fig. 1, film gates which guide two film strips

43 and 44 perpendicularly to the apex line of the prism are shown by way of example. Film strip 43 in film gate 41 will record two part records which may be separated by any suitable method, for example according to that disclosed in Patent No. 1,738,095, of December 3, 1929. Film 44 in film gate 42 receives a series of records of the third part image, in the customary manner. Any suitable type of film movement can be employed for shifting the films, whereby it will be understood that strip 43 must move two steps for each step of film 44.

Other film arrangements are possible and will be shown in combination with other modifications of the light divider, it being understood that any of the latter can be used with any of the film arrangements or combinations thereof.

Instead of subdividing component beam B, beam A can be split as shown in Fig. 2. This embodiment is essentially similar to that of Fig. 1 concerning its optical function, with the only difference that the reflection of beams is less evenly divided, direct beam B of Fig. 2 being only once reflected at 56, beam A twice at 16 and 55, and beam G three times at 16, 55 and 57. In Fig. 1, beam A is reflected twice at 16 and 5, beam E once at 36, and beam F two times at 36 and 37. For certain purposes, the embodiment eccording to Fig. 2 may be somewhat more compact than that of Fig. 2. In Fig. 2 a film W of double width is shown for recording images *a* and *e*, and a single width film F for receiving image *f*, both films moving in the direction of the apex line and parallel to surfaces 11, 14 and 55, respectively. The films are drawn as if turned 90° from their actual aperture plane into the paper plane in order to simplify the showing.

By properly selecting the reflection-transmission ratio of the semi-transparent surfaces and the number of reflections in relation to the filter transmissions and emulsion sensitivities it is easily possible to obtain an illumination of optimum usefulness under the circumstances at hand, selections of this kind being familiar to those skilled in the art.

Filters may be arranged in any suitable way, for example as shown in the drawing.

It should be noted in this connection that filters may be cemented to the respective surface if that surface only emits but does not reflect light. On the other hand, filters arranged in front of transmitting and reflecting surfaces must be spaced from their respective prism faces by air gaps since, without this provision, these faces would not act as total reflectors, but transmit all light incident thereon.

By combining the embodiments of Figs. 1 and 2, as shown in Fig. 3, beam R can be divided into four component beams K, M, N and P. In this embodiment, three similar prisms 61, 62, 63 of obtuse isosceles triangular section are cemented together along their shorter sides, the cemented surfaces 64, 65, 66 being rendered partly reflecting as above discussed. It will now be evident that beam K is reflected three times at 64, 67 and 66, beam M twice at 64 and 67, beam N once at 68, and beam P twice at 68 and 65. In accordance with the number of reflections, images *k* and *n* are reversed with respect to images *m* and *p*.

Fig. 5 shows diagrammatically a combination of the embodiments according to Fig. 1 of the parent application, and of Fig. 2 and is numbered accordingly. In this modification, beam R is divided into four component beams S, T, U and V in a manner which will now be understood without further explanation. The images *s* and *u* are reversed with respect to images *u* and *v*, as indicated. Filters may be associated with faces 12, 13, 18 and 19, and the images may be recorded on films arranged in suitable manner, as for example indicated in Fig. 1.

The arrangement according to Fig. 3 is more compact than that of Fig. 4, but the latter has one total reflection less, namely that at 68 of Fig. 3.

The prism units of triangular cross-section according to Figs. 1, 2 and 3 have the further advantage of permitting the addition of a finder for viewing a composite image even during the use of the apparatus in which the light divider is incorporated. In the case of a camera for color photography, the various color aspects as recorded on the separate films can be superimposed and viewed in full color. As indicated in Fig. 3 in dotted lines, the rays coming from image *p* are reflected at 65 and together with those from *n* reflected at 68 and 64, emerging through face 68; the rays from *k* are reflected at 66 and together with those from *m* reflected at 67 emerging through 64 and, together with rays *p* and *n*, through face 68. By arranging a viewing lens system Q adjacent to face 68, the superposed images can be continuously observed. It will be noted that, in this manner, every surface and surface portion of the prism unit according to Fig. 3 is put to use, the whole arrangement forming a device of optimum compactness and shortness and uniformity of light paths.

It will be understood that many other modifications and applications of the above-described embodiments of our invention are feasible; for example, the prism angles may be changed to some extent; the prism units may be used for superposing light beams instead of dividing them, as indicated in Fig. 3, for a view finder. The invention is useful for other purposes, as for example additive projection of color separation records. Objectives may be arranged in each component emergent beam instead of using a single lens system in the entrant beam. The prism unit can be used with equal advantage for still picture photography as well as cinematography.

It should be understood that the present disclosure is for the purpose of illustration only and that this invention includes all modifications and equivalents which fall within the scope of the appended claims.

We claim:

1. A light dividing system of the type employing partly transmitting and partly reflecting surfaces for dividing an image carrying light beam into component beams concomitantly forming several images from said beam, comprising a prism having a perpendicular section defining a triangle, a transmitting-reflecting surface dividing one angle of said triangle, a free surface forming the incident side of said angle and being at a totally transmitting angle to said beam, and a second transmitting-reflecting surface dividing a second angle of said triangle and extending from said second angle towards said first transmitting-reflecting surface, said beam entering substantially unreflected through said free surface being divided at said first transmitting-reflecting surface, the component beams being reflected at the two free surfaces forming said first angle, one of said reflected beams being divided at said second transmitting-reflecting surface into two component beams directed to the surfaces forming said second angle, and the other reflected beam being directed to the third free surface.

2. A light dividing system of the type employing partly transmitting and partly reflecting surfaces for dividing an image carrying light beam into component beams concomitantly forming several images from said beam, comprising a prism having a perpendicular section defining a substantially equilateral triangle, a transmitting-reflecting surface substantially bisecting one angle of said triangle, a free surface forming the incident side of said angle and being at a totally transmitting angle to said beam, and a second transmitting-reflecting surface substantially bisecting a second angle of said triangle and extending from said second angle towards said first transmitting-reflecting surface, said beam entering substantially unreflected through said free surface being divided at said first transmitting-reflecting surface, the component beams being reflected at the two free surfaces forming said first angle, one of said reflected beams being divided at said second transmitting-reflecting surface into two component beams directed to the surfaces forming said second angle, and the other reflected beam being directed to the third free surface.

3. A light dividing system of the type employing partly transmitting and partly reflecting surfaces for dividing an image carrying light beam into component beams concomitantly forming several images from said beam, comprising a prism having a perpendicular section defining a triangle, a transmitting-reflecting surface dividing one angle of said triangle, a free surface forming the incident and a second free surface forming a reflecting side of said angle, said first surface being at a totally transmitting angle to said beam, and a second transmitting-reflecting surface dividing a second angle of said triangle formed by said second surface and a third surface, and extending from said second angle towards said first transmitting-reflecting surface, said beam entering substantially unreflected through said first surface being divided at said first transmitting-reflecting surface, the component beams being reflected at the free surfaces forming said first angle, the beam reflected at said second surface being divided at said second transmitting-reflecting surface into two component beams directed to the surfaces forming said second angle, and the other reflected beam being directed to said third surface.

4. A light dividing system of the type employing partly transmitting and partly reflecting surfaces for dividing an image carrying light beam into component beams concomitantly forming several images from said beam, comprising a prism having a perpendicular section defining a triangle, a transmitting-reflecting surface dividing one angle of said triangle, a free surface forming the incident and a second free surface forming a reflecting side of said angle, said first surface being at a totally transmitting angle to said beam, and a second transmitting-reflecting surface dividing a second angle of said triangle formed by said first surface and a third surface and extending from said second angle towards said first transmitting-reflecting surface, said beam entering substantially unreflected through said first surface being divided at said first transmitting-reflecting surface, the component beams being reflected at the free surfaces forming said first angle, the beam reflected at said first surface being divided at said second transmitting-reflecting surface into two component beams directed to the surfaces forming said second angle, and the other reflected beam being directed to said third surface.

5. A light dividing system of the type employing partly transmitting and partly reflecting surfaces for dividing an image carrying light beam into component beams concomitantly forming several images from said beam, comprising a prism having a perpendicular section defining a triangle, three transmitting-reflecting surfaces, each surface dividing one of the three angles of said triangle and terminating at the intersection with another surface, and a free surface forming the incident side of one of said angles and being at a totally transmitting angle to said beam, said beam entering substantially unreflected through said free surface being divided at said transmitting-reflecting surface dividing said first-mentioned angle, the component beams being reflected at the free surfaces forming said first angle, and each of said reflected beams being divided at said transmitting-reflecting surfaces dividing said other two angles into two component beams directed to the surfaces forming said other two angles.

6. A light dividing system of the type employing partly transmitting and partly reflecting surfaces for dividing a light beam into component beams concomitantly forming several images of an object field, comprising a prism having a perpendicular section defining a substantially equilateral triangle formed by three free surfaces of the prism, and three transmitting-reflecting surfaces substantially bisecting the angles of said triangle and each extending from its respective angle to the center of said triangle, a light beam entering said prism through a free surface forming any one of said angles at a totally transmitting angle being first divided at the transmitting-reflecting surfaces bisecting said angle, the two component beams being totally reflected at the two other free surfaces and each reflected component beam being again divided at said other transmitting-reflecting surfaces, the resulting component beams being directed towards said free surfaces.

JOSEPH A. BALL.
WADSWORTH E. POHL.